(12) United States Patent
Yoshimura et al.

(10) Patent No.: US 7,228,372 B2
(45) Date of Patent: Jun. 5, 2007

(54) DATA COMMUNICATION SYSTEM WITH AN SPI BUS HAVING A PLURALITY OF DEVICES WHEREIN DATA COMMUNICATIONS ARE ENABLED USING COMMUNICATION PROTOCOLS OPTIMUM TO RESPECTIVE DEVICES

(75) Inventors: Kentaro Yoshimura, Hitachi (JP); Wataru Nagaura, Hitachinaka (JP); Takanori Yokoyama, Hitachi (JP); Nobuyasu Kanekawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 95 days.

(21) Appl. No.: 11/016,769

(22) Filed: Dec. 21, 2004

(65) Prior Publication Data

US 2005/0172059 A1 Aug. 4, 2005

(30) Foreign Application Priority Data

Jan. 7, 2004 (JP) ............................. 2004-002284

(51) Int. Cl.
*G06F 3/00* (2006.01)
*G06F 13/00* (2006.01)
*H04L 7/00* (2006.01)
*H04L 29/06* (2006.01)
*H04J 3/06* (2006.01)

(52) U.S. Cl. .................... 710/110; 710/22; 375/354; 701/1

(58) Field of Classification Search ............... 710/110, 710/305, 72, 61, 107, 105, 240, 22; 370/257, 370/463, 465, 469; 709/208, 223, 230, 251; 713/400; 455/507; 375/222, 354; 701/1
See application file for complete search history.

(56) References Cited

U.S. PATENT DOCUMENTS 5,299,193 A * 3/1994 Szczepanek ................. 370/463

(Continued)

FOREIGN PATENT DOCUMENTS

JP 2000-257501 9/2000

OTHER PUBLICATIONS

"High performance, energy efficient master-slave flip-flops circuits" by Ko et al. (abstract only) Publication Date: Oct. 9-11, 1995.*

(Continued)

*Primary Examiner*—Gopal C. Ray
(74) *Attorney, Agent, or Firm*—Crowell & Moring LLP

(57) ABSTRACT

A data communication system includes a master device, a plurality of slave devices, at least either a data transmission bus which connects the master device to a plurality of slave devices to transfer data from the master device to the slave devices in synchronism with a synchronous clock signal or a data reception bus over which the master device receives data from the slave devices in synchronism with a synchronous clock signal, and Chip Select signal lines which one-to-one connect the master device to the slave devices. The data communication system also includes communication drivers for setting a physical protocol of each slave device and a communication manager to arbitrate serial communications between the master device and the slave devices. The communication manager arbitrates serial communications to slave devices by their proper physical protocols. Communication protocols such as baud rates, clock polarities, and clock phases are switched by asserted Chip Select signal lines.

12 Claims, 13 Drawing Sheets

U.S. PATENT DOCUMENTS

| | | | |
|---|---|---|---|
| 5,305,317 A * | 4/1994 | Szczepanek | 370/257 |
| 6,163,538 A * | 12/2000 | Brown et al. | 370/389 |
| 6,523,081 B1 * | 2/2003 | Karlsson et al. | 710/305 |
| 6,611,860 B1 * | 8/2003 | Ying | 709/208 |
| 2002/0193073 A1 * | 12/2002 | Fujioka | 455/41 |
| 2005/0172059 A1 * | 8/2005 | Yoshimura et al. | 710/110 |

OTHER PUBLICATIONS

"Power is Control" MPC 555 User's Manual—Revised .095 Jan. 2001 (Motorola). Overview of Chapter 14—pp. 14-1 through 14-76.

* cited by examiner

US 7,228,372 B2

DATA COMMUNICATION SYSTEM WITH AN SPI BUS HAVING A PLURALITY OF DEVICES WHEREIN DATA COMMUNICATIONS ARE ENABLED USING COMMUNICATION PROTOCOLS OPTIMUM TO RESPECTIVE DEVICES

CLAIM OF PRIORITY

The present application claims priority from Japanese application serial no. 2004-002284, filed on Jan. 7, 2004, the content of which is hereby incorporated by reference into this application.

FIELD OF THE INVENTION

The present invention relates to a data communication system which performs one-to-many data communications using a serial communication bus, specifically a serial peripheral interface (SPI) communication and an embedded controller equipped with such a data communication system.

BACKGROUND OF THE INVENTION

One of well-known conventional arts for a data communication system is a technique to set physical protocol such as a baud rate and clock polarity phase in correspondence to a physical data communication means. (For example, see Japanese Patent Laid-Open No. 2000-257501 (Page 25, FIG. 3, 300)) Another art is a technique using serial peripheral interface (hereinafter abbreviated as SPI) which is a clock synchronization serial bus communication having Chip Select signal lines as physical data communication means. (For example, see "MPC555 User's Manual MPC555UMJ/AD R0.95" (Pages 449 to 525)).

SUMMARY OF THE INVENTION

As one kind of embedded controller, for example, there has been a vehicle controller which controls a car engine, throttle, transmission, braking, steering, and battery on a car. Recently, the vehicle controllers have been requested to have higher functions to reduce fuel consumption and exhaust gas. For fine vehicle operation control, the embedded controller is equipped with an IC that processes signals of micro computers, sensors, and actuators. The results of measurement and output value data are transferred by data communication over an SPI communication bus.

As for the data communication system disclosed by said Patent Document which sets a communication protocol for each physical communication means, it has a problem that the communication protocols must be made common for all devices that are connected to a one-to-many communication bus. Although micro computers can transfer data at high baud rates, some kinds of ICs can handle only comparative low baud rates. Therefore, when the SPI communication bus has micro computers and ICs together, the baud rates of all devices are limited by the baud rate of the slowest device. This kills high transmission abilities of micro computers, increases the transmission time, and consequently deteriorates the communication performance of the system.

An object of this invention is to provide a data communication system which enables appropriate communications with a plurality of communication protocols on a single SPI communication bus.

This invention is characterized by providing, as a serial communication driver, a communication driver for each device to set a physical protocol for each device on a serial communication bus and a communication manager to arbitrate serial communications on the bus.

From one point of view, this invention provides a data communication system comprising a master device, a plurality of slave devices, a synchronous clock signal bus which connects the master device and the slave devices to transfer clock signals for synchronization of data transfer, at least one of a data transmission bus over which the master device sends data to the slave device in synchronism with a synchronous clock signal and a data reception bus over which the master device sends data from the slave device in synchronism with a synchronous clock signal, and Chip Select signal lines each of which connects the maser device to respective slave devices in the one-to-one manner for serial communications, wherein the data communication system is equipped with a serial communication driver containing device communication drivers each of which sets a physical protocol of each slave device and a communication manager which arbitrates serial communications between the master device and the slave devices.

The serial communication driver should preferably have the characteristics below.

1) The serial communication driver changes the clock frequency based on the synchronous clock signal on the synchronous clock signal bus by a Chip Select signal line asserted by the master device.

2) The serial communication driver changes the clock phase of a synchronous clock signal transferred over the synchronous clock signal bus by a Chip Select signal line asserted by the master device.

3) The serial communication driver changes the clock synchronization phase of at least one of transmission data on the data transmission bus and reception data on the data reception bus in synchronism with the synchronous clock signal by a Chip Select signal line asserted by the master device.

In general, the serial communication driver which consists of device communication drivers each of which sets a physical protocol of each slave device and a communication manager which arbitrates serial communications between the master device and the slave devices is executed for example by a program stored in ROM. This invention is applicable to all serial communication drivers independently of their names as far as they have above characteristics 1) to 3) even when the serial communication driver does not explicitly have device communication drivers and a communication manager. This invention is not limited to a serial communication driver having drivers and a manager by those names.

The above means enables the simultaneous use of devices of different protocols on a single communication bus and serial communications at maximum transfer efficiencies by their protocols. As the result, the serial communication of the whole system is sped up.

BRIEF DESCRIPTION OF THE DRAWINGS

FIG. 1($b$) is an example of configuration of a data communication system which is a first embodiment of this invention.

DESCRIPTION OF THE PREFERRED EMBODIMENTS

Figure 1A:
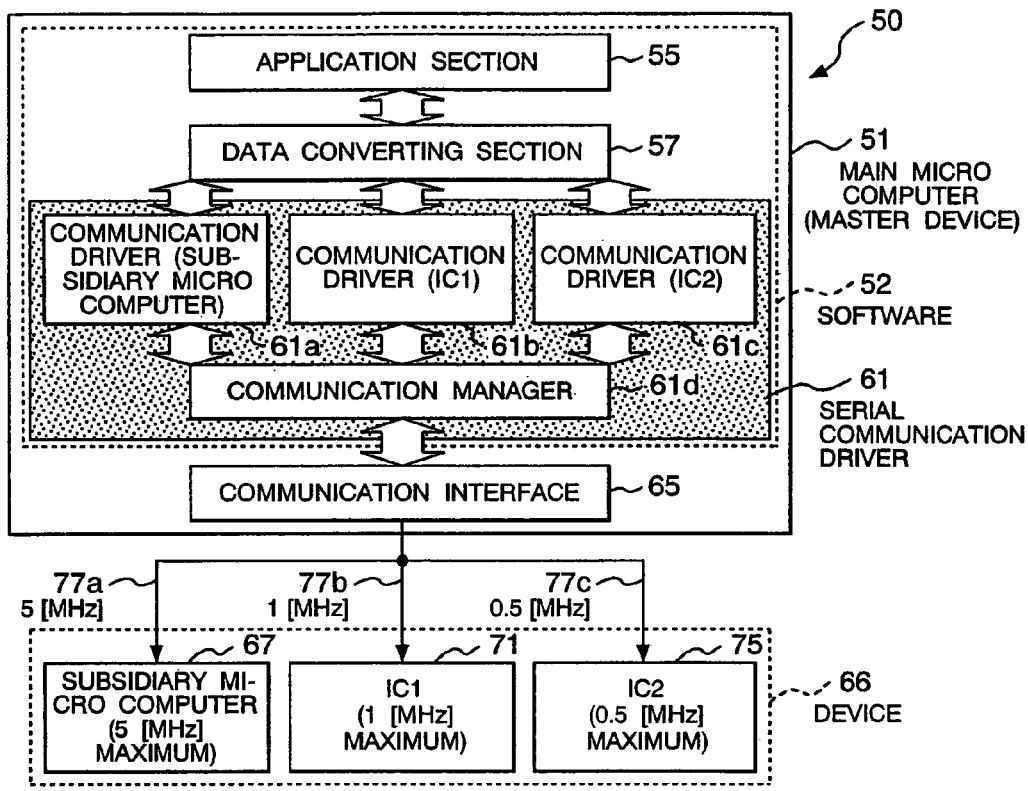
FIG. 1($a$) is a conceptual drawing showing an example of configuration of a data communication system in accordance with this invention.

First will be outlined the data communication system of this invention before the explanation of preferred embodiments of the present invention. FIG. 1(a) is an example of basic configuration of a data communication system in accordance with this invention. Referring to FIG. 1(a), the data communication system 50 for SPI serial communications consists of a master device 51, slave devices (67, 71, and 75), at least either a data transmission bus which connects the master device 51 and the slave devices (67, 71, and 75) to transfer data from the master device 51 to the slave devices (67, 71, and 75) in synchronism with a synchronous clock signal or a data reception bus to transfer data from the slave devices (67, 71, and 75) to the master device 51, and Chip Select signal lines which respectively connect the master device 51 and each of the slave devices (67, 71, and 75) in the one-to-one manner to post implementation of communication. Further, the data communication system 50 contains communication drivers (61a, 61b, and 61c) and a communication manager 61e which arbitrates serial communication between the master device 51 and the slave devices (67, 71, and 75). The communication manager 61e arbitrates serial communications to the slave devices (67, 71, and 75) via a communication interface 65 by their appropriate physical protocols.

Next will be explained preferred embodiments in accordance with the above principle of this invention with reference to the accompanying drawings. The embodiments below use an electronic control unit (ECU) for vehicle as an example of an embedded controller equipped with the data communication system.

Figure 1B:
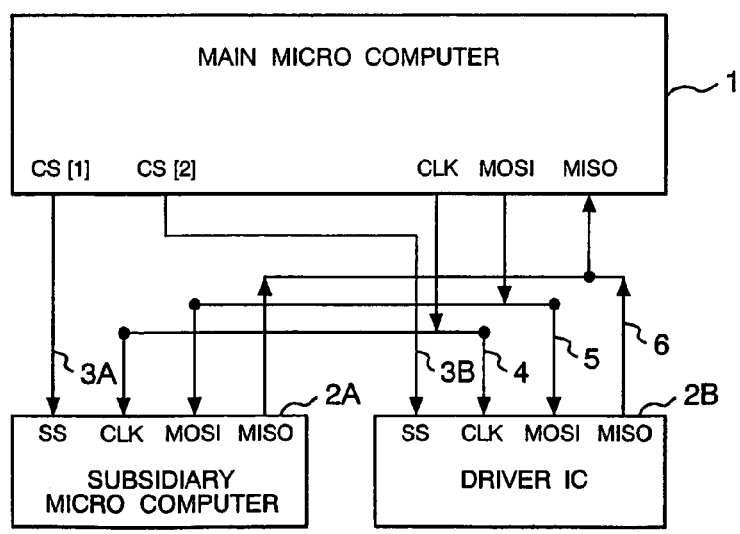

FIG. 1(b) is an example of configuration of a data communication system which is a first embodiment of this invention. Referring to FIG. 1(b), the data communication system of this embodiment consists of a main micro computer 1 (equivalent to the master device), a subsidiary micro computer 2A, and an I/O controlling driver IC 2B. The subsidiary micro computer 2A and the I/O controlling driver IC 2B are slave devices.

In the above configuration, the Chip Select signal line 3A is controlled by the main micro computer 1 to post implementation of a communication from the main micro computer 1 to the subsidiary micro computer 2A. Similarly, the Chip Select signal line 3B is controlled by the main micro computer 1 to post implementation of a communication from the main micro computer 1 to the I/O controlling driver IC 2B.

The clock signal bus 4 (equivalent to the synchronous clock signal bus) is controlled by the main micro computer 1 to output a clock signal to synchronize data transfer from the master device to the subsidiary device. The data transmission line 5 is controlled by the main micro computer 1 to output data from the main micro computer 1 to the subsidiary micro computer 2A or to the driver IC 2B in synchronism with a clock signal from the clock signal line 4. The data reception line 6 is controlled by the main micro computer 1 to output data from a slave device to the master device in synchronism with a clock signal.

Figure 2A:
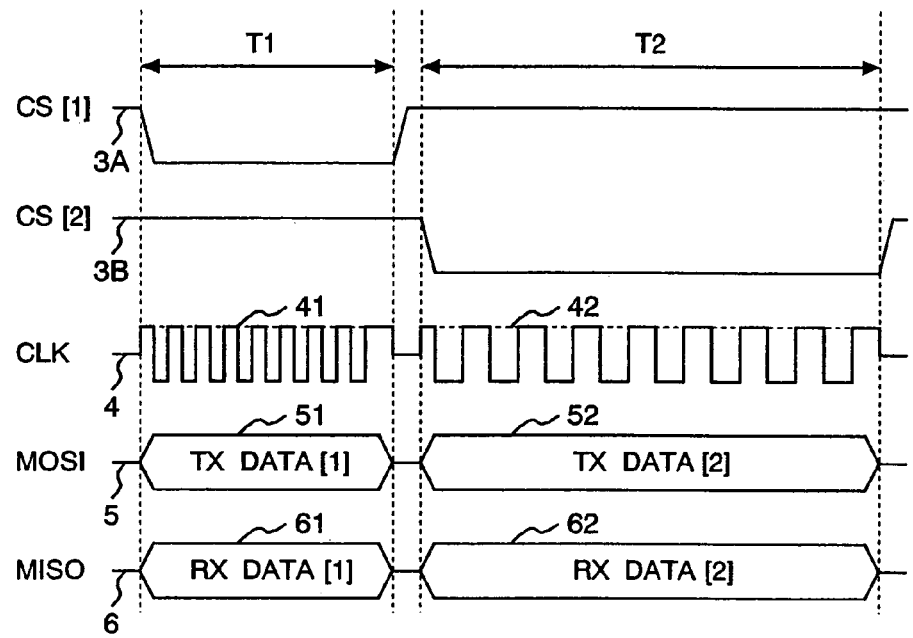
FIG. 2($a$) is a first operation example of the data communication system which is one embodiment of this invention.
FIG. 2(b) is a second operation example of the data communication system which is one embodiment of this invention.

FIG. 2(a) is a first operation example of the data communication system of this embodiment, showing output signal waveforms of Chip Select signal lines (3A and 3B), clock signal line 4, data transmission line 5, and data reception line 6. In FIG. 2(a), the horizontal axis represents a time base and the vertical axis represents a signal voltage base. Referring to FIG. 2(a), the Chip Select signal lines 3A and 3B are negated at a High voltage or asserted at a Low voltage. The synchronous clock signal 4 is negative in the High status or active in the Low status.

As shown in the first operation example of FIG. 2(a), in the time period T1, the main micro computer 1 of FIG. 1(b) asserts the Chip Select signal line 3A to implement an SPI communication between the main micro computer 1 and the subsidiary micro computer 2A. The main micro computer 1 controls the clock signal line 4 to output clock signals by the size (e.g. 8 bits) of communication data at a baud rate (e.g. 2 MHz) fit for communication with the subsidiary micro computer. The main micro computer 1 outputs transmission data (TX DATA) 51 to the subsidiary micro computer 2 in synchronism with the clock signal. The subsidiary micro computer 2 outputs reception data (RX DATA) 61 to the main micro computer 1 in synchronism with the clock signal. At the end of output of the clock signal, the main micro computer 1 negates the Chip Select signal line 3A and ends the SPI communication between the main micro computer 1 and the subsidiary micro computer 2A.

In the time period T2, the main micro computer 1 asserts the Chip Select signal line 3B to implement an SPI communication between the main micro computer 1 and the I/O controlling driver IC 2B. The main micro computer 1 controls the clock signal line 4 to output clock signals by the size (e.g. 8 bits) of communication data at a baud rate (e.g. 1 MHz)-fit for communication with the I/O controlling driver IC 2B. The main micro computer 1 outputs transmission data (TX DATA) 52 to the I/O controlling driver IC 2B in synchronism with the clock signal. The I/O controlling driver IC 2B outputs reception data (RX DATA) 62 to the main micro computer 1 in synchronism with the clock signal. At the end of output of the clock signal, the main micro computer 1 negates the Chip Select signal line 3B and ends the SPI communication between the main micro computer 1 and the I/O controlling driver IC 2B.

In the first operation example of this embodiment, frequencies of synchronous signals used in the SPI communication are one-to-one assigned to the Chip Select signal lines to be asserted. Therefore, for example, if devices in SPI communication interface have different upper clock frequency limits as in a combination of a high-performance micro computer and inexpensive driver ICs, synchronous clock frequencies fit for the slave devices can be used. In other words, the system configuration of FIG. 1(b) enables use of different protocols on the SPI communication bus.

Although the data communication system of FIG. 1(b) connects a Chip Select signal lines 3, a clock signal line 4, a data transmission line 5, and a data reception line 6 to each slave device, it is possible to connect either a data transmission line or a data reception line instead of both transmission and reception lines to a slave device. For example, the sensor driver IC can be connected to a Chip Select signal line 3, a clock signal line 4, and a data reception line 6 to transfer data measured by sensors.

Figure 2B:
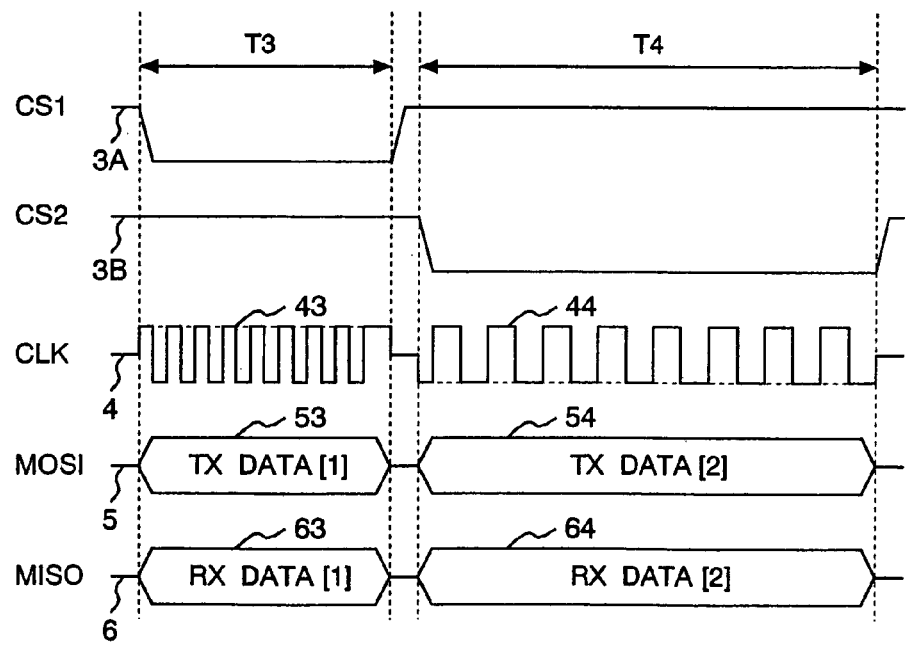

Below will be explained another operation example of this embodiment. Its system configuration is basically similar to the configuration of FIG. 2(a). The explanation will be made with reference to FIG. 1(a) and FIG. 1(b) if necessary. FIG. 2(b) is a second operation example of the data communication system of this embodiment. In the output signal waveforms of the second operation example of FIG. 2(b), the synchronous clock signal CLK43 is negative in the Low status or active in the High status while the Chip Select signal line 3A is asserted (during a time period T3). The synchronous clock signal 44 is negative in the Low status or active in the High status while the Chip Select signal line 3B is asserted (during a time period T4) or while the main micro computer 1 is communicating with the driver IC 2B. The numeric symbols 53, 54, 63, and 64 in FIG. 2(b) are respectively equivalent to the numeric symbols 51, 52, 61, and 62 in FIG. 2(a).

The clock polarities 43, 44 of synchronous signals are one-to-one assigned to the Chip Select signal lines to be asserted. Therefore, the second operation example of FIG. 2(b) can have communication protocols of different clock polarity settings simultaneously on the SPI communication bus, for example a setting of making the synchronous clock signal active at a High voltage and a setting of making the synchronous clock signal active at a Low voltage.

Figure 3:
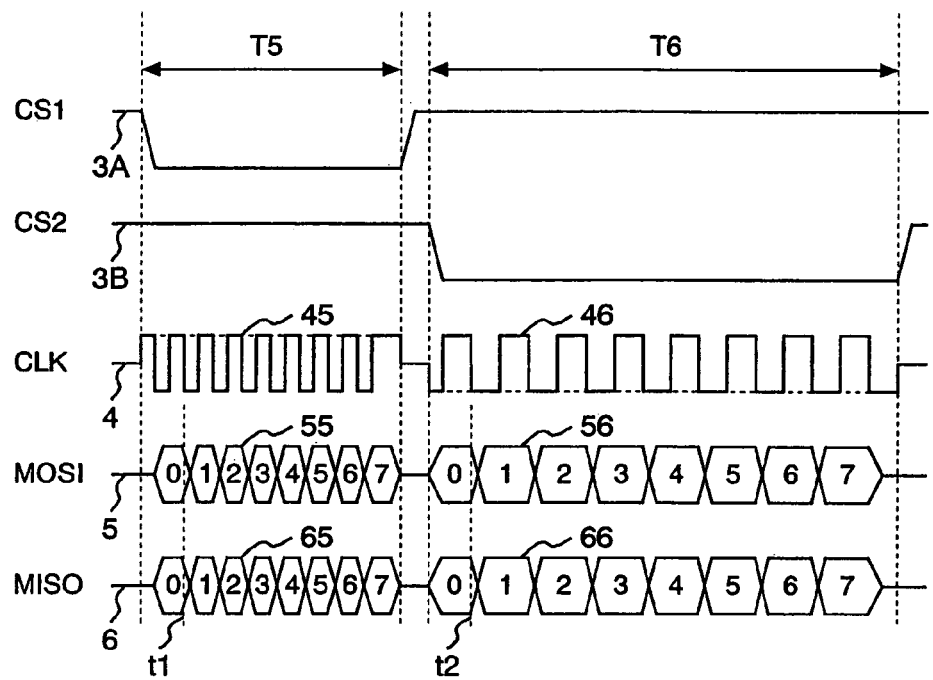
FIG. 3 is a third operation example of the data communication system which is one embodiment of this invention.

FIG. 3 shows a third operation example of the data communication system of this embodiment, showing signal waveforms for data communication. In this third operation example, the Chip Select signal lines 3A and 3B are negated at a High voltage or asserted at a Low voltage. While the Chip Select signal line 3A is asserted (a time period of T5) or while the main micro computer 1 is communicating with a subsidiary micro computer 2A, the transmission data 55 and the reception data 65 are updated respectively by the main micro computer 1 and the subsidiary micro computer 2A at a rise of a clock signal (e.g. time t1) at which the synchronous clock signal 45 changes the status from negative to active. While the Chip Select signal line 3B is asserted (a time period of T6) or while the main micro computer 1 is communicating with a drive IC 2B, the transmission data 56 and the reception data 66 are updated respectively by the main micro computer 1 and the drive IC 2B at a fall of a clock signal (e.g. time t2) at which the synchronous clock signal 45 changes the status from active to negative.

The third operation example of FIG. 3 can have communication protocols of different clock phase settings simultaneously on the SPI communication bus, for example a setting of updating data at a rise of the synchronous clock signal and a setting of updating data at a fall of the synchronous clock signal.

Figure 4:
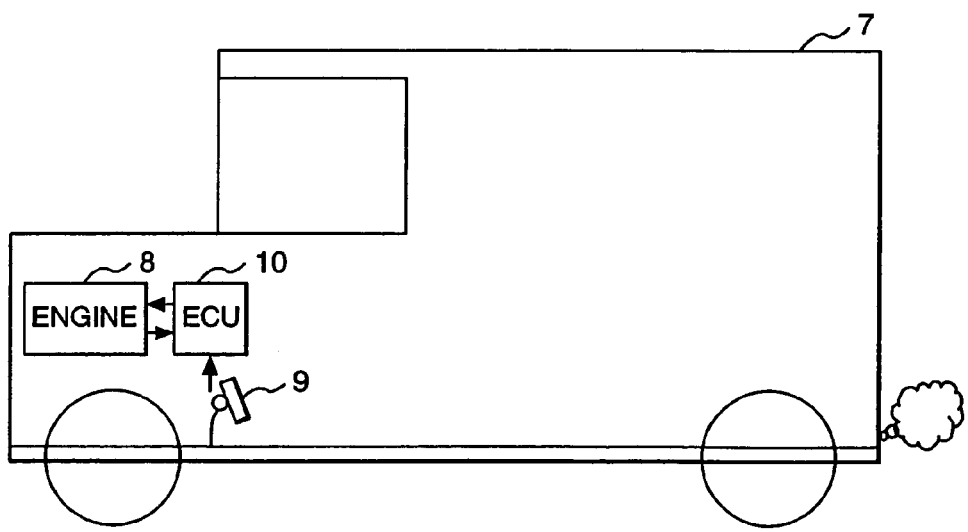
FIG. 4 is an application of the data communication system which is one embodiment of this invention to part of a vehicle controller.

Next will be explained a second embodiment of this invention. This embodiment is an application of the data communication system of the first embodiment to a vehicle. FIG. 4 shows a vehicle in accordance of this embodiment. As shown in FIG. 4, the vehicle 7 is equipped with an engine 8, an electronic control unit (ECU) 10 for controlling the engine, and an accelerator (gas pedal) 9 to be operated by a vehicle driver. Here, the ECU 10 can be an embedded controller to control an automatic transmission, an electronic control throttle, and a motor-driven brake that are not shown in the drawing) in addition to controlling the engine. In short, the ECU of FIG. 4 is an embedded controller to perform various kinds of vehicle-related control.

Figure 5:
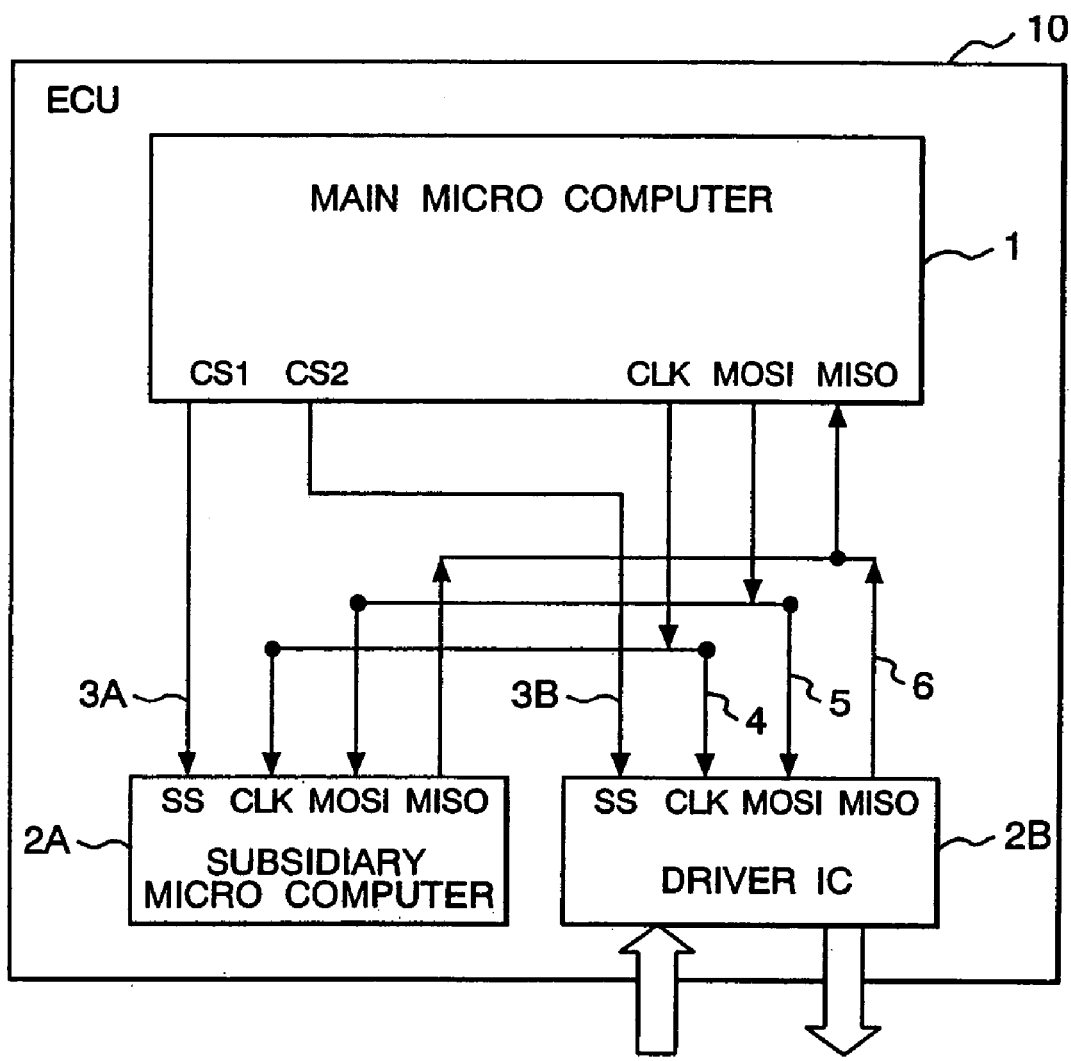
FIG. 5 shows an outlined configuration of the vehicle controller of FIG. 4.

FIG. 5 shows an example of ECU in accordance with the second embodiment of this invention. As shown in FIG. 5, the ECU 10 is equipped with the data communication system of FIG. 1(b). The driver IC 2B receives values measured by sensors (e.g. accelerator opening) and sends them to the main micro computer 1 by the SPI communication. The main micro computer 1 receives the values, calculates output voltage values and port values from the measured values, and sends them to the driver IC 2B. The data communication between the main micro computer and subsidiary micro computers is also implemented by the SPI communication.

Figure 6:
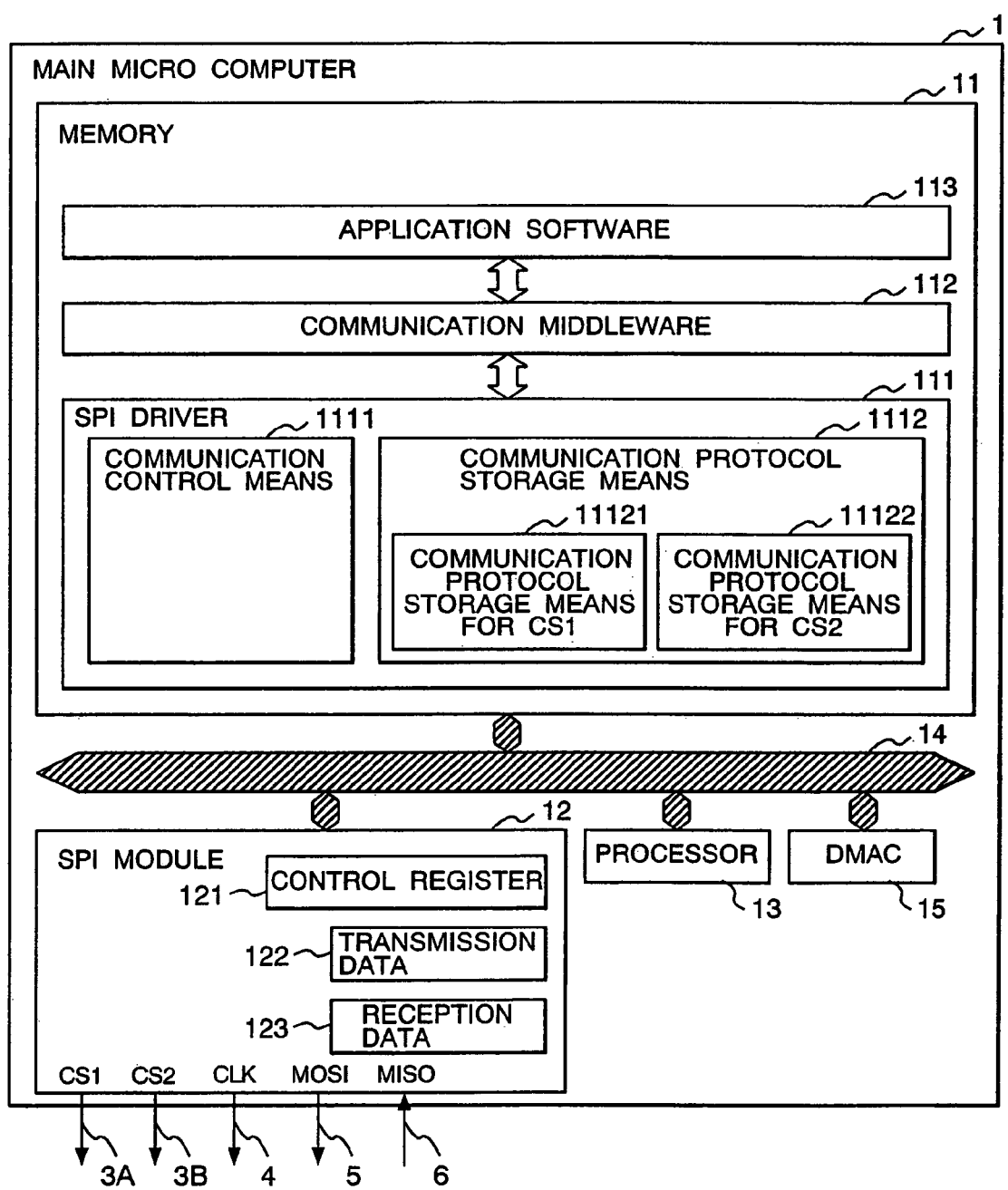
FIG. 6 shows the outline of the main micro computer in the data communication system which is one embodiment of this invention.

FIG. 6 is an example of basic configuration of the main micro computer 1 of FIG. 5. As shown in FIG. 6, the main micro computer 1 consists of memory 11, an SPI module 12 to control the SPI communication bus, a processor 13 to perform arithmetic operations, and a data bus 14, a direct memory access (DMA) controller 15. The SPI module 12 contains a control register 121 to set a physical protocol for SPI communication, transmission data memory 122 to store data to be sent out from the main micro computer and reception data memory 123 to store data that is received by the micro computer. Memory 11 contains application software 113 for computing control data and so on, communication middleware 112 for converting control data to data of the type and size available to the SPI driver, and an SPI driver 111 for controlling the SPI module to implement the SPI communication. The SPI driver 111 contains a communication protocol storage means 11121 for a subsidiary micro computer, a communication protocol storage means 11122 for a driver IC, and a communication control means 1111. Reference symbols 3A, 3B, and 4 to 6 of FIG. 6 are respectively equivalent to those of FIG. 1(b) and FIG. 5.

Figure 7:
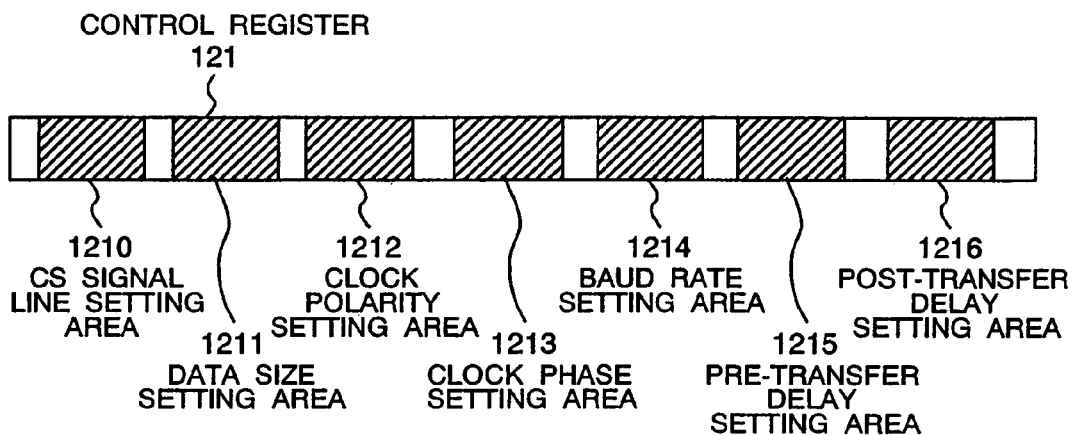
FIG. 7 shows an example of configuration of a control register in the data communication system which is one embodiment of this invention.

FIG. 7 shows an example of configuration of the control register 121 in the SPI module. As shown in FIG. 7, the control register 121 consists of a CS signal line setting area 1210 to set a Chip Select signal line to be asserted, a data size setting area 1211 to set the size (in bits) of data to be transferred, a clock polarity setting area 1212, a clock phase setting area 1213, a baud rate setting area 1214 to set a baud rate of a synchronous clock signal, a pre-transfer delay setting area 1215 to set a pre-transfer delay between assertion of a Chip Select signal line and output of a synchronous clock signal, and a post-transfer delay setting area 1216 to set a post-transfer delay between output of a synchronous clock signal and negation of a Chip Select signal line.

Figure 8:
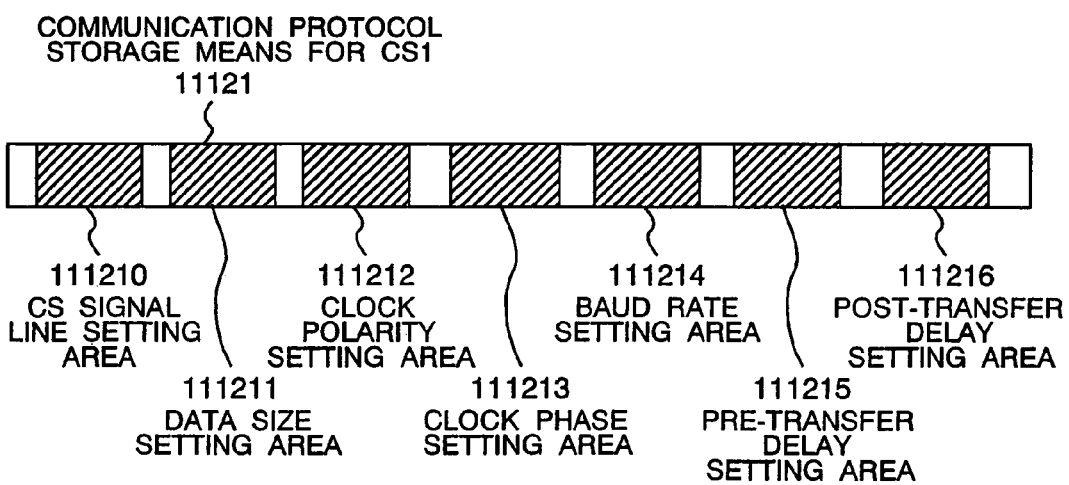
FIG. 8 shows an example of configuration of a communication protocol storage means for CS1.

FIG. 8 shows an example of configuration of the communication protocol storage means 11121 for a subsidiary micro computer in the SPI module. As shown in FIG. 8, the communication protocol storage means 11121 for a subsidiary micro computer consists of a CS signal line storing area 111210 to store a Chip Select signal line to be asserted, a data size storing area 111211 to store the size (in bits) of data to be transferred, a clock polarity storing area 111212, a clock phase storing area 111213, a baud rate storing area 111214 to store a baud rate of a synchronous clock signal, a pre-transfer delay storing area 111215 to store a pre-transfer delay between assertion of a Chip Select signal line and output of a synchronous clock signal, and a post-transfer delay storing area 111216 to store a post-transfer delay between output of a synchronous clock signal and negation of a Chip Select signal line.

Figure 9A:
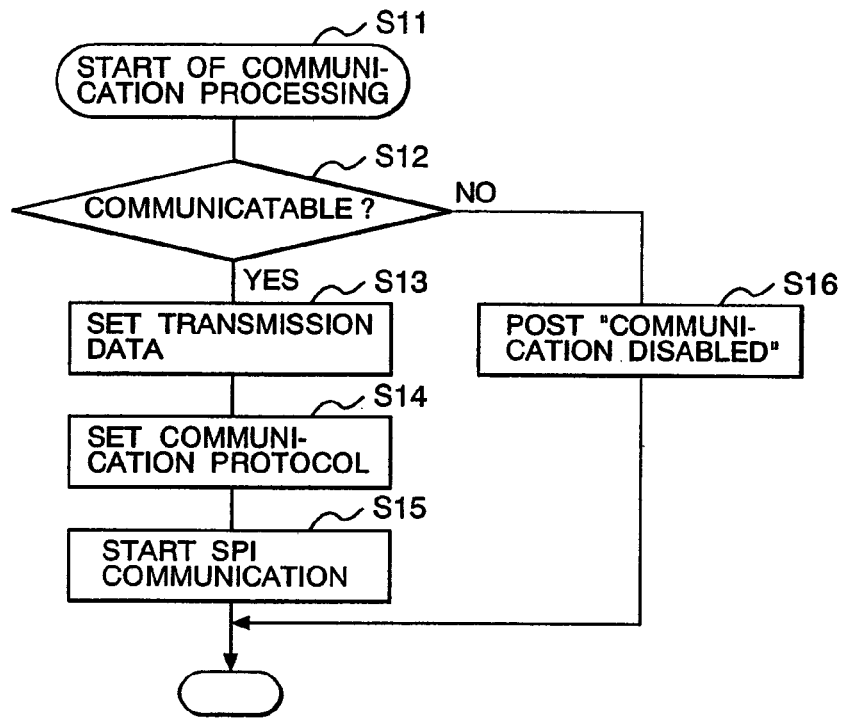
FIG. 9A is a first operation flow chart of the communication control means in the data communication system which is one embodiment of this invention.
Figure 9B:
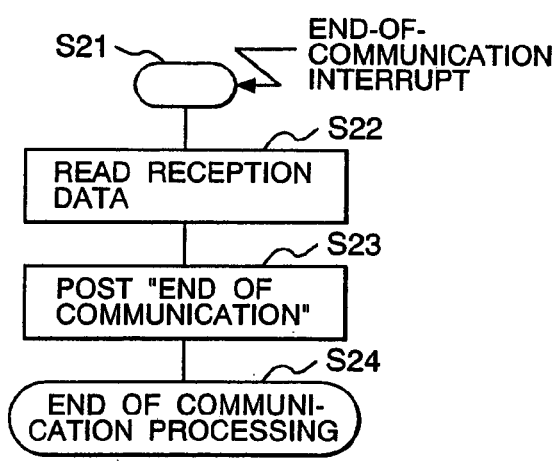
FIG. 9B is a first operation flow chart of the communication control means in the data communication system which is one embodiment of this invention.

FIG. 9 shows an operation flow chart of the communication control means 1111. As shown in FIG. 9, when communication middleware 112 runs the communication control means 1111 at step S12. Communication processing starts. At step S12, the communication control means 1111 checks whether the system is now in communication or ready to start a communication. When finding the system is ready to start a communication, the communication control means 1111 goes to step S13. At step S13, the communication control means 1111 sets transmission data in the transmission data memory 122. The processing at step S13 can be omitted when only data reception is implemented. At step S14, the communication control means 1111 selects a communication protocol of a destination device from the communication protocol storage means 1112 and sets it in the control register 121. At step S15, the communication control means 1111 submits a Start Communication command to the SPI module 12. The communication starts. When finding the system is not ready for communication at step S12, the communication control means 1111 goes to step S16. At step S16, the communication control means 1111 posts the Busy status to the communication middleware 112 and then temporarily stops communication processing.

Control is transferred to step S21 when an End of Communication interrupt occurs at the end of the SPI communication that started at step S15. The post-processing of the SPI communication starts at step S21. At step S22, the communication control means 1111 reads the received data from the reception data memory 123. The processing at step S22 can be omitted when only data transmission is implemented. Then at step S23, the communication control means 1111 posts the Communication Processing Completed message to the communication middleware 112. At step S24, communication processing is complete. The system configuration of FIG. 6 to FIG. 9 enables the use of different communication protocols simultaneously even when the SPI module has only one control register to set communication protocols for the SPI communication bus.

Further, the system configuration of FIG. 6 and FIG. 8 enables storage of a communication protocol specific to each destination device. Accordingly, even when a device connected to the communication bus is changed, the system has only to change its communication protocol storage means and can use the other communication protocol storage means without changing them. In other words, this enables efficient development of a data communication system that can use different communication protocols on a single SPI communication bus.

Figure 10:
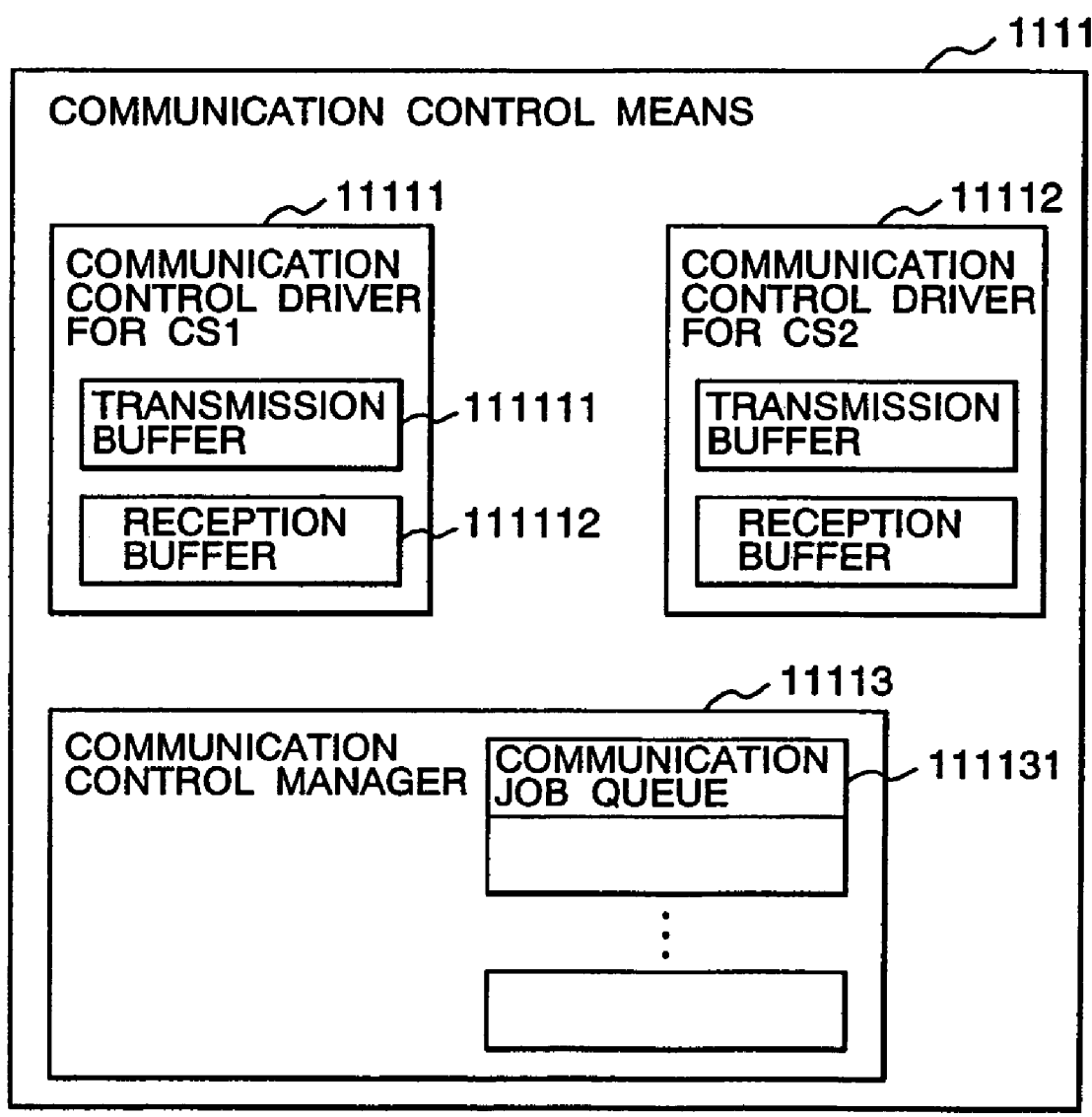
FIG. 10 is an example of configuration of the communication control means of this embodiment.

FIG. 10 is an example of configuration of the communication control means of this embodiment. As shown in FIG. 10, the communication control means 1111 consists of a communication control driver 11111 for a subsidiary micro computer, a communication control driver 11112 for a driver IC, and a communication control manager 11113. The communication control driver 11111 for a subsidiary micro computer contains a transmission buffer 111111 to store data to be transmitted and a reception buffer 111112 to store received data. Similarly, the communication control driver 11112 for a driver IC contains a transmission buffer and a reception buffer. The communication control manager 11113 contains a communication job queue 111131 to store communication start requests.

Figure 11A:
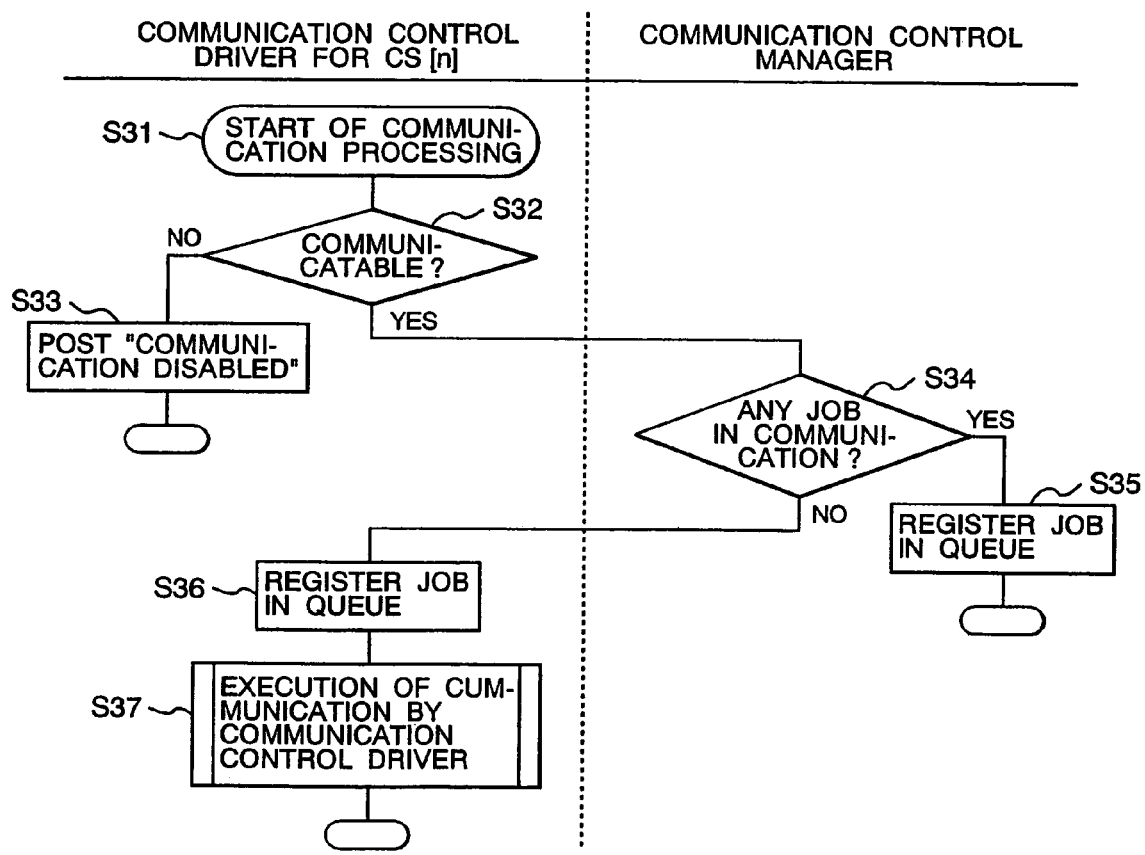
FIG. 11A is a second operation flow chart of the communication control means in the data communication system which is one embodiment of this invention.
Figure 11B:
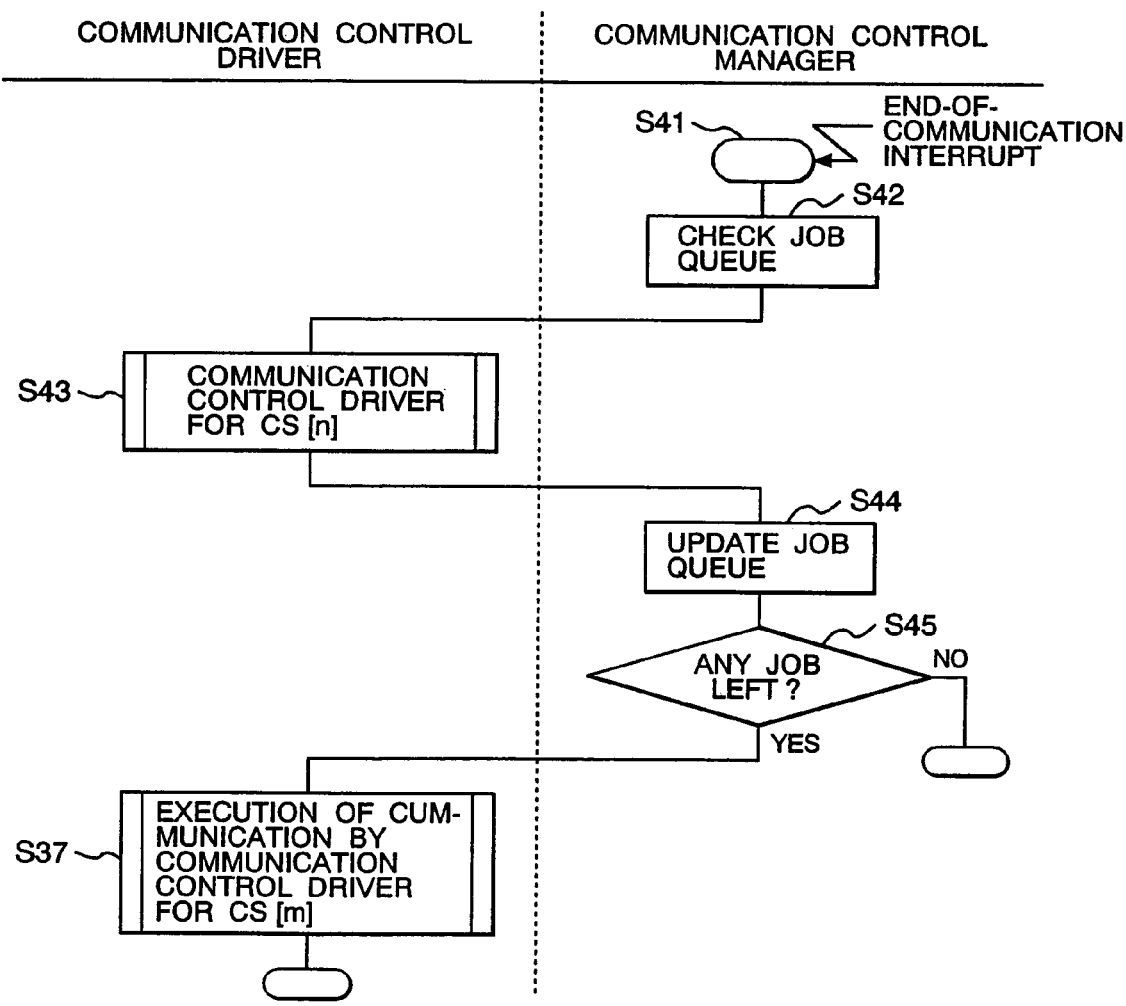
FIG. 11B is a second operation flow chart of the communication control means in the data communication system which is one embodiment of this invention, which is continued from FIG. 11A.

FIG. 11A and FIG. 11B respectively show examples of communication processing by the communication control means. This is explained with reference to FIG. 10. This example assumes that a request is made to communicate with the subsidiary micro computer 2. FIG. 11A shows a processing example in which the communication control driver 11111 is called by the communication middleware 112. As shown in FIG. 11A, the communication control driver 11111 is called by the communication middleware 112 at step S31 and starts communication processing. At step S32, the communication control driver 11111 checks whether the system is ready to communicate with a subsidiary micro computer (whether it is now communicating with the subsidiary micro computer). When finding the system is not ready for communication, the communication control driver 1111 goes to step S33. At step S33, the communication control driver 1111 posts the Busy status to the communication middleware 112 and ends processing.

When the system is ready for communication, the communication control driver 1111 calls the communication control manager 11113. At step S34, the communication control manager 11113 checks the content of the communication Job queue 111131 for a Job which is now running. When finding a running Job, the communication control manager 11113 goes to step S35 and adds the requested destination (the subsidiary micro computer 2 in this example) to the end of jobs and stops the processing. When finding no running Job, the communication control manager 11113 goes to step S36, registers the requested destination to the top of jobs, and calls a communication control driver for the destination (the communication control driver for the subsidiary micro computer in this example). At step S37, the communication control driver for the subsidiary micro computer starts processing to implement the SPI communication. After the SPI communication starts, the communication control manager 11113 temporarily stops processing.

FIG. 11B shows an operation flow chart in the case the communication control driver 11111 is called by an End of Communication interrupt from a processor. As shown in FIG. 11B, when the SPI communication ends, control is transferred to step S41 by the End of Communication interrupt from a processor and the post-processing of the SPI communication starts. At step S42, the communication control manager checks the destination of a communication job which is in the top element of the job queue 111131. At step S43, the communication control manager calls the communication end processing of a communication control driver (a communication control driver for the subsidiary micro computer in this example) for the destination set in the top job queue element. When the communication end processing ends, the content of the job queue is updated by the communication control manager at step S44.

The communication control manager clears the communication job in the top job queue element and increments, by one, the number of respective communication jobs set in the job queue. At step S45, the communication control manager checks the communication job queue 111131 for another communication job waiting to be implemented. When finding no communication job waiting to be implemented, the communication control manager ends processing. When finding a communication job to be implemented (a communication control driver for the driver IC in this example), the communication control manager calls step S37 to start communication with the communication control driver for a destination set in the top job queue element.

Figure 12:
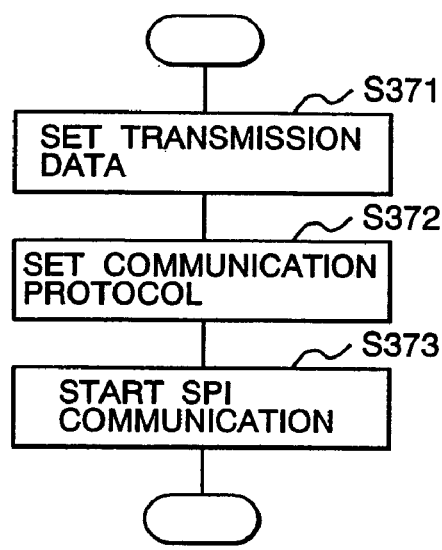
FIG. 12 shows a communication starting flow of the communication control driver.

FIG. 12 shows a communication starting flow of the communication control driver 11111 for a subsidiary micro computer as an example of communication start processing (step S37) of the communication control driver. At step S371, the communication control driver 11111 sets transmission data by copying data from its transmission buffer 111111 onto transmission data memory 122 (of FIG. 6). At step S372, the communication control driver 11111 sets a communication protocol for the subsidiary micro computer by copying the communication protocol from the communication protocol storage means 11121 (for the subsidiary micro computer) onto the control register 121. At step S373, the communication control driver 11111 instructs the SPI module to start communication.

Figure 13:
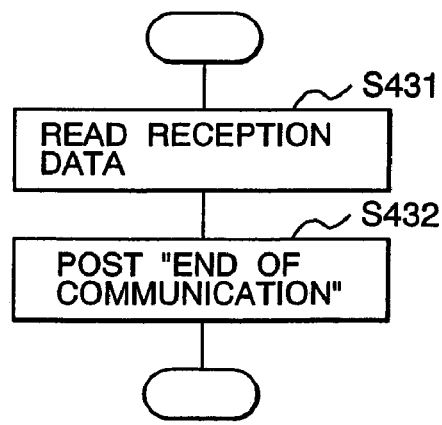
FIG. 13 shows a communication ending flow of the communication control driver.

FIG. 13 shows a communication ending flow of the communication control driver 11111 for a subsidiary micro computer as an example of communication end processing (step S43 of FIG. 11A) of the communication control driver. At step S431, the communication control driver 11111 reads data (received by the SPI communication) from the reception data memory S123 and copies it onto the reception buffer 111112. At step S432, the communication control driver 11111 posts the end of the SPI communication to the middleware 112.

Figure 14:
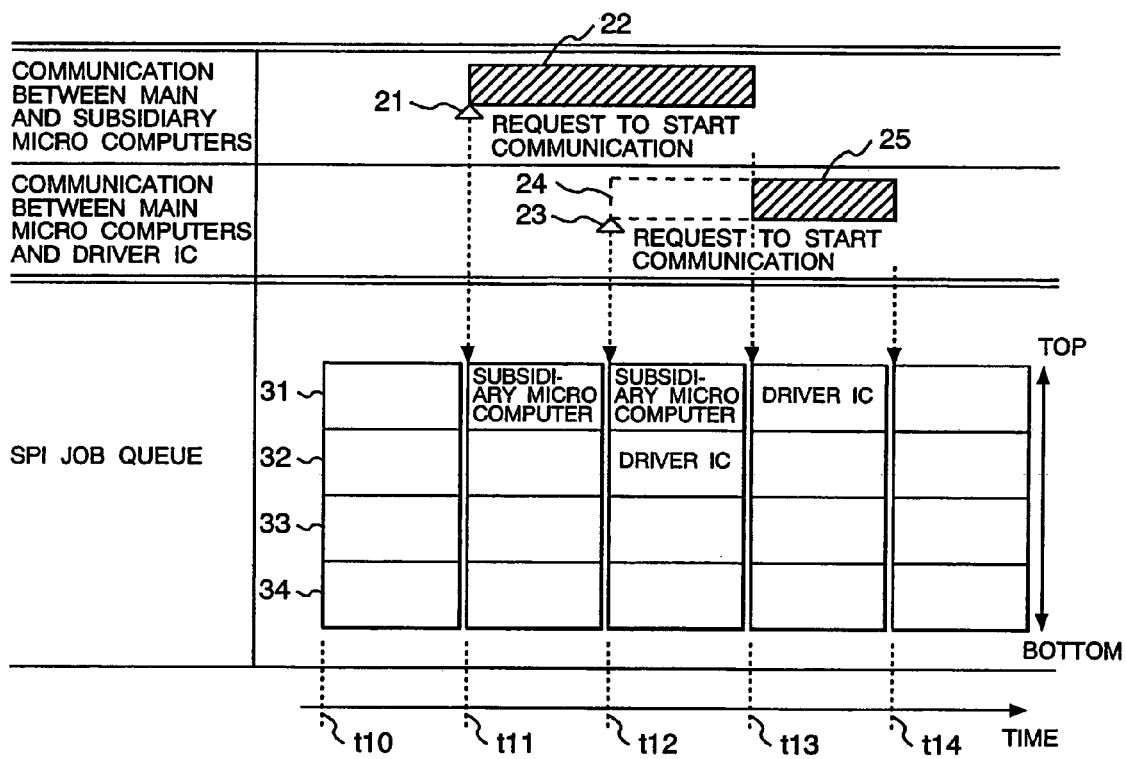
FIG. 14 is a conceptual drawing of operation of the data communication system which is one embodiment of this invention.

FIG. 14 is a conceptual drawing of operation of the data communication system in accordance with this embodiment. At time t10, the (SPI) communication job queue (having elements 31 to 34) is empty. At time t11, a request 21 is called to start communication with a subsidiary micro computer 2A. The communication request 21 is set in the top job queue element 31 as the job queue is empty. The communication protocol for the subsidiary micro computer is set and the SPI communication 22 starts. At time t12, another request 23 is called to start communication with a driver IC 2B. The communication request 23 is set in the next Job queue element 32 as the top job queue element 31 is already occupied. Here, the main micro computer temporarily stops the processing and waits for start of communication 24.

At time t13, the communication with the subsidiary micro computer 2A is complete. The main micro computer checks the communication job queue, implements post-processing of communication of the subsidiary micro computer 2A which is set in the top job queue element, and updates the content of the job queue. Then, the main micro computer checks the job queue and implements a communication 25 with a driver IC (which is now in job queue element 31 by updating and shifting from queue element 32 to queue element 31). At time t14, the communication with the driver IC 2B is complete. The main micro computer checks the communication job queue, implements post-processing of communication of the driver IC 2B which is set in the top job queue element 31, and updates the content of the job queue. Then, the main micro computer checks the job queue again. When finding the job queue is empty, the main micro computer ends the SPI communication processing.

Figure 15:
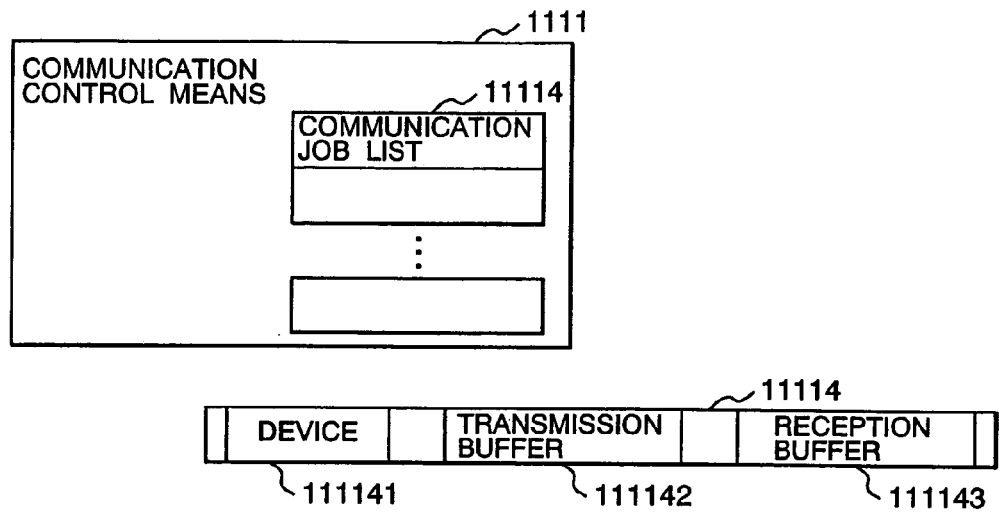
FIG. 15 shows an example of configuration of the communication control means which is a second embodiment of this invention.

FIG. 15 shows another configuration example of the communication control means 1111 in the data communication system in accordance with this embodiment. In the configuration of FIG. 15, the communication control means 1111 contains a communication job list 11114. Each element of the communication job list 11114 stores information of a destination device 111141, transmission buffer 111142, and reception buffer 111143. The communication middleware sets transmission data and destination data in the communication job list and requests to start the SPI communication. When the SPI communication starts, the processor reads the registered communication jobs from the communication job list and implements the jobs in sequence. When all communication jobs are completed, the received data can be read from the reception buffer.

The DMA controller 15, when used, can execute communication jobs (copying from the transmission buffer to data memory 122, copying from the communication protocol storage means 1112 to the control register, and copying from reception data memory 123 to the reception buffer 111143) without imposing a burden on the processor 13.

Figure 16:
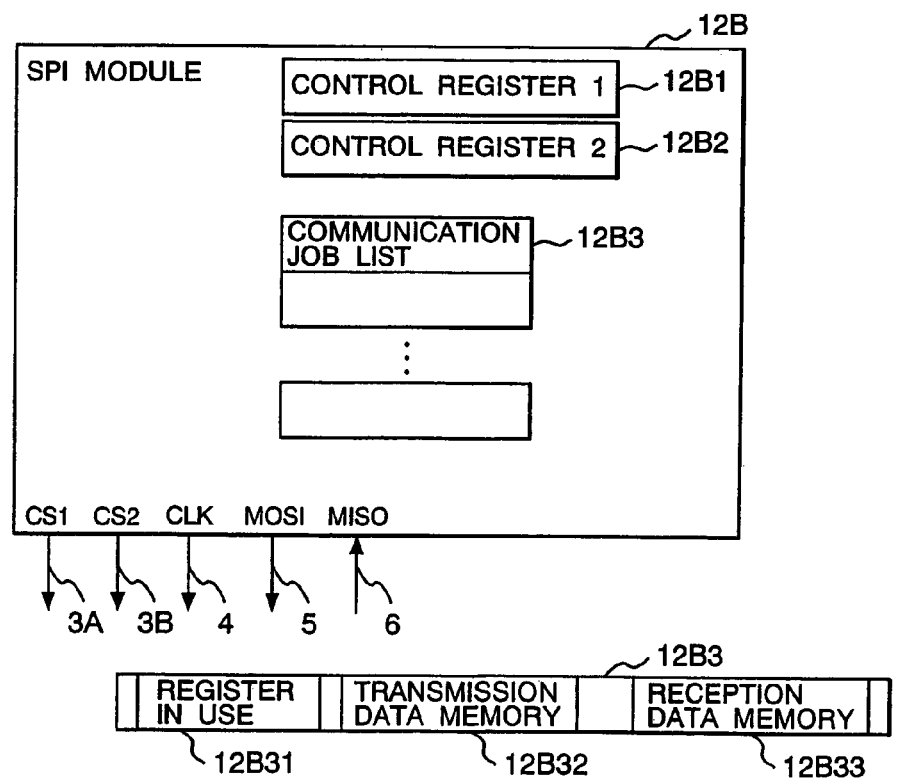
FIG. 16 shows an example of configuration of the SPI module which is a third embodiment of this invention.

FIG. 16 shows another configuration example of the SPI module 12 in the data communication system in accordance with this embodiment. The reference symbols 3A, 3B, and 4 to 6 are respectively equivalent to those of FIG. 1(b) and FIG. 5. As shown in FIG. 16, the SPI module 12B contains some control registers (12B1 and 12B2) and a communication job list 12B3. Each control register has the same configuration as the control register 121 of FIG. 7. Each element of the communication job list 12B3 stores information 12B31 of a control register to be used, transmission data memory 12B32 to store data to be transmitted, and reception data memory 12B33 to store received data. The SPI driver 111 sets transmission data and a required control register in the communication job list 12B3 and requests to start the SPI communication. When the SPI communication starts, the SPI module 12B reads the registered communication Jobs from the communication job list 12B3 and implements the jobs in sequence. When all communication Jobs are completed, the received data can be read from the reception data memory 12B33. As explained in the above configuration example, it is possible to provide two or more control registers and physically switch communication protocols.

At step S13 of FIG. 9A, data to be transmitted is stored in the transmission data memory 122. The step S13 can be omitted when only data reception is implemented. At step S14, a communication protocol for the destination device is set in the control register 121 in reference to the communication protocol storage means 1112. At step S15, the communication control means submits a command to start the SPI communication to the SPI module 12 and then temporarily stops communication processing. When the SPI communication cannot be started at step S12, control is transferred to step S16.

The data communication system in accordance with each of the above embodiments of this invention switches the baud rate of a synchronous clock signal by the asserted Chip Select signal line in serial communications such as SPI communication. Therefore, the data communication system can communicate using a communication protocol optimum to a destination device.

Similarly, the data communication system switches the clock polarity of a synchronous clock signal by the asserted Chip Select signal line in SPI communication. Therefore, the data communication system can communicate using a communication protocol optimum to a destination device. Further, the data communication system switches the clock phase of a synchronous clock signal by the asserted Chip Select signal line in SPI communication. Therefore, the data communication system can communicate using a communication protocol optimum to a destination device.

Additionally, the data communication system is equipped with a communication protocol storage means for each destination slave device and a communication control means which calls a proper communication protocol storage means to implement an SPI communication. Therefore, the data communication system can communicate using a communication protocol optimum to a destination device.

Further, the data communication system is equipped with a communication control driver for each destination slave device and a communication control manager which exclusively controls a communication control driver. Therefore, the data communication system can communicate using a communication protocol optimum to a destination device.

Further, as the communication protocol storage means and communication control means are accomplished by software that runs on memory, even an SPI module having only one control register can switch communication protocols. Therefore, the data communication system can communicate using a communication protocol optimum to a destination device.

Furthermore, as a DMA controller is used to handle communication protocols and transfer data (for transmission and reception) between the SPI module and memory, the SPI module having only one control register can switch communication protocols quickly.

What is claimed is:

1. A data communication system comprising a master device, a plurality of slave devices, a synchronous clock signal bus which connects the master device and the slave devices to transfer clock signals for synchronization of data transfer, at least one of i) a data transmission bus over which the master device sends data to the slave devices in synchronism with a synchronous clock signal and ii) a data reception bus over which the master device sends data from the slave device in synchronism with a synchronous clock signal, and Chip Select signal lines each of which connects the master device to respective slave devices in the one-to-one manner for serial communications, wherein the data communication system is equipped with device communication drivers each of which sets a physical protocol of each slave device and a serial communication driver containing a communication manager which arbitrates serial communication between the master device and the slave device.

2. The data communication system of claim 1, wherein the serial communication driver changes the frequency of a synchronous clock signal transferred over the synchronous clock signal bus by the Chip Select signal lines which are asserted by the master device.

3. The data communication system of claim 1, wherein the serial communication driver changes clock polarity of a synchronous clock signal transferred over the synchronous clock signal bus by the Chip Select signal lines which are asserted by the master device.

4. The data communication system of claim 1, wherein the serial communication driver changes clock phase of at least one of i) transmission data on the data transmission bus and ii) reception data on the data reception bus in synchronism with the synchronous clock signal by the Chip Select signal lines asserted by the master device.

5. The data communication system of claim 1, wherein the master device comprises:
   a communication protocol storage means which retains at least value selected from the group consisting of baud rate, clock polarity, clock phase, transmission data size, a pre-transfer delay time, and a post-transfer delay time for each slave device; and
   a communication control means which calls a communication protocol from the communication protocol storage means and implements serial transmission to the slave device.

6. The data communication system of claim 5, wherein the communication control means comprises:
   communication control drivers each of which is provided for a respective slave device, has at least one of a transmission buffer for storing data to be transmitted and a reception buffer for storing received data, controls the data communication bus by communication protocol set values which are stored in the communication protocol storage means in response to a communication request, and implements at least one of transmission of data from the transmission data buffer and reception of data in the reception data buffer; and
   a communication control means which contains a communication job storage means for storing a communication start request, works to call a transmission process of the communication control driver of the slave device when a communication start request is made by the communication control driver of the slave device, to store the communication start request in the communication job storage means when the other communication control driver is in communication, to call the reception process of the communication control driver when the serial peripheral interface (SPI) communication is completed, and to call the transmission process of the stored communication control driver when a communication job is stored in the communication job storage means.

7. The data communication system of claim 6, wherein the master device is a micro computer which has a serial communication module equipped with only one communication control register for setting a communication protocol of the data communication bus.

8. The data communication system of claim 7, wherein
   the data communication system has a direct memory access controller which transfers data directly without using a CPU; and
   the direct memory access controller sets a communication protocol from the communication protocol storage means to the communication control register.

9. A program for causing the micro computer of claim 7 to execute a communication protocol storage step to retain at least one of values selected from the group consisting of baud rate, clock polarity, clock phase, transmission data size, a pre-transfer delay time, and a post-transfer delay time for each slave device and a step for calling a communication protocol which is retained at the communication protocol storage step and implementing serial transmission to the slave device.

10. An embedded controller equipped with the data communication system of claim 1, comprising
- an external input processing means for processing signals which are one of i) input signals measured by sensors and ii) input signals coming from the other embedded controller into data;
- a control computing means for computing the input signals into control data; and
- an external output processing means for processing the control data into a control signal to drive an actuator;
- wherein the control computing means communicates with at least one of the external input processing means, the external output processing means, and the other control computing means.

11. A vehicle operation controller equipped with the data communication system of claim 1, said vehicle operation controller comprising:
- an external input processing means for processing any of input signals such as driver's commands and vehicle status measured by sensors and signals coming from the other vehicle controller into data;
- a control computing means for computing the input signals into control data; and
- an external output processing means for processing the control data into a control signal to drive an actuator;
- wherein the control computing means communicates with at least one of the external input processing means, the external output processing means, and the other control computing means.

12. A data communication system for serial communication comprising a master device, a plurality of slave devices, and Chip Select signal lines each of which connects the master device to respective slave devices and posts implementation of communication, wherein the data communication system is equipped with a serial communication driver consisting of communication drivers each of which is provided for each slave device to set a physical protocol of the slave device and a communication manager which arbitrates serial communication between the master device and the slave devices.

* * * * *